US006077136A

United States Patent [19]

Arai et al.

[11] Patent Number: 6,077,136

[45] Date of Patent: Jun. 20, 2000

[54] OUTBOARD MOTOR CONTROL

[75] Inventors: Hideto Arai; Kazumasa Tanimoto, both of Shizuoka, Japan

[73] Assignee: Sanshin Kogyo Kabushiki Kaisha, Japan

[21] Appl. No.: 09/054,355

[22] Filed: Apr. 2, 1998

[30] Foreign Application Priority Data

Apr. 2, 1997 [JP] Japan ..................................... 9-08766

[51] Int. Cl.[7] .................................................... B60K 41/00

[52] U.S. Cl. ................................................................ 440/86

[58] Field of Search ............................... 440/84–87, 900, 440/75; 74/480 B

[56] References Cited

U.S. PATENT DOCUMENTS

| | | | |
|---|---|---|---|
| 4,144,956 | 3/1979 | Baba | 74/480 B |
| 4,549,869 | 10/1985 | Iida et al. . | |
| 4,566,415 | 1/1986 | Iwai et al. . | |
| 4,925,416 | 5/1990 | Oishi | 440/84 |
| 5,692,931 | 12/1997 | Kawai . | |

*Primary Examiner*—Ed Swinehart
*Attorney, Agent, or Firm*—Knobbe, Martens, Olson & Bear, LLP

[57] ABSTRACT

A shift and throttle control mechanism allows for control of the shift and throttle features of an outboard motor through two separate operators. For instance, one operator can be remotely positioned in the hull of an associated watercraft, while the other operator can be formed on a steering handle of the outboard motor. The shift and throttle control mechanism is also configured to fit within a cowling of the outboard motor, together with a four-cycle engine, without significantly increasing the size of the cowling. In one mode, the shift and throttle control mechanism includes a shift shaft arranged toward the front side of the engine. One of the operators is directly connected to shift shaft by a linkage rod. The other operator is connected by a shift control cable to a shift lever that is located on the side of the engine. This location of the shift lever allows the end of the shift control cable to be fixed within the cowling without increasing the cowling's size. A link connects the shift lever to the shift shaft, which in turn actuates a shift rod to control a transmission of the outboard motor.

24 Claims, 5 Drawing Sheets

OUTBOARD MOTOR CONTROL

BACKGROUND OF THE INVENTION

1. Field of the Invention

The present invention relates to a marine engine for an outboard motor, and more particularly to a shift and throttle control mechanism for a marine engine.

2. Description of Related Art

Outboard motors recently have become equipped with four-cycle engines. The use of four-cycle engines in the power head of the outboard motor, however, raises some formidable challenges in regard to the engine layout and arrangement within the protective engine cowling.

For instance, in prior engine designs, the four-cycle engine commonly includes a large crankcase, as compared with two-cycle engines. A larger engine also results because a four-cycle engine requires an oil pan. As a result, prior outboard motor designs with four-cycle engines have struggled to provide sufficient space within the cowling in which to position many of the outboard motor components, including a shifting mechanism.

Prior shifting mechanisms often permit two separate control operators to couple to the shifting mechanism so as to control the shifting mechanism from two locations. One operator often is remotely positioned in the hull of the associated watercraft near the steering controls of the watercraft. The other operator usually comprises an integral part of the outboard motor and resides on a steering handle attached to a steering bracket of the outboard motor.

The shifting mechanism associated with an outboard motor employing a two-cycle engine usually includes a shift shaft to which shift control cables are attached. The points of attachment between the shift shaft and the shift control cables generally lie on the front side of the engine inside a lower tray of the outboard motor's cowling. The shift control cables extend from each operator to the shift shaft. Such cables, typically bowden-wire cables, usually include an inner cable wire that sides through an outer tubular casing. A fitting commonly connects an exposed end of the cable wire to the shift shaft, and a bracket fixes an end of the outer tubular casing within the lower tray.

Although desirable to fix the end of the cable tubular casing at a point near the shift shaft within the outboard motor's cowling, the size of the cowling's lower tray previously has not permitted it when used with four-cycle engines. A four-cycle engine usually occupies most of the space within the lower tray. Prior outboard motors thus have either enlarged the cowling or have not secured the end of the cable casing within the cowling lower tray. Both of these approaches though are less than satisfactory.

In addition, prior two-cycle outboard motors commonly employ a neutral safety mechanism that operates between the shifting mechanism and a throttle valve drive unit. The throttle valve drive unit is controlled by one or more operators via throttle control cables, and drives the actuation of one or more throttle valves on the engine. Such throttle valves, and thus the throttle valve drive unit, usually lie toward the forward end of the two-cycle engine. In this location, the throttle valve drive unit and the shifting shaft of the shifting mechanism reside near each other such that the neutral safety mechanism can regulate the throttle valve drive unit in accordance with the position of the shifting mechanism. The neutral safety mechanism prevents the engine from running at high speeds when the shifting mechanism establishes a neutral drive condition.

The adaptation of this safety mechanism to outboard motors employing four-cycle engines has been difficult, again because of space constraints caused by the larger engine. The arrangement of other engine components within the cowling has also posed problems. For instance, in a carbureted four-cycle engine, the carburetors usually lie at a generally central location on the side of the engine. The conventional neutral safety mechanism cannot be used with a carburetor so positioned because too long of a link is required to connect the throttle valves of the carburetors with the neutral safety mechanism. The link also typically must be bent at multiple locations in order to avoid other engine components. As a consequence, the manufacturing costs of the engine increase and the durability of the rod decreases.

A need therefore exists for a shift control mechanism for an outboard motor which allows a shift control cable from a remote operator to be fixed within the cowling of the outboard motor without requiring a larger cowling size. A need also exists for an improved neutral safety mechanism for a four-cycle engine.

SUMMARY OF THE INVENTION

An aspect of the present invention involves an outboard motor including an engine that drives a propulsion device through a transmission. The transmission is intended to operate under at least two operational conditions. A transmission actuator cooperates with the transmission to selectively establish one of the at least two operational conditions, and a shifting mechanism is coupled to the transmission actuator by a shift rod so as to control the transmission actuator. A shift control cable is connected to the shifting mechanism through a first shift lever and a link. The link connects the shift lever to the shifting mechanism.

Another aspect of the present invention involves providing a neutral safety mechanism that prevents the engine from running at high speeds with the transmission in neutral. The outboard motor includes an engine having at least one throttle valve and an output shaft which drives a propulsion device through a transmission. The transmission is intended to operate under at least two operational conditions, and a transmission actuator cooperates with the transmission to selectively establish one of the at least two operational conditions. A shifting mechanism controls the transmission actuator, and a throttle valve drive unit is coupled to the throttle valve. The throttle valve drive unit includes a cam member that is positioned to interact with a rotatable lever of the shifting mechanism. The interaction between the cam member and the rotatable lever limits the degree of rotation of the cam member, and thus the throttle valve drive unit, with the lever positioned within a predetermined rotational range. As a result, the throttle valve control device cannot open the throttle valve beyond a preset degree with the rotatable lever of the shifting mechanism positioned within the predetermined range of rotation. In one mode, the predetermined range of movement of the lever corresponds to a range of movement of the transmission actuator in which a neutral condition of the transmission is established.

The shift lever and the cam member desirably lie on the side of the engine near the throttle valve. In this location, a generally straight link can connect the throttle valve drive unit to the throttle valve. The use of a straightened link reduces engine manufacturing costs, as well as improves the feeling of shift and throttle control through a remote operator.

Further aspects, features and advantages of the present invention will now become apparent from a detailed description of the preferred embodiment which follows.

BRIEF DESCRIPTION OF THE DRAWINGS

The above-mentioned and other features of the invention will now be described with reference to the drawings of a preferred embodiment of the present shift and throttle control mechanism. The illustrated embodiment is intended to illustrate, and not to limit the invention. The drawings contain the following figures.

DETAILED DESCRIPTION OF PREFERRED EMBODIMENT OF THE INVENTION

Figure 1:
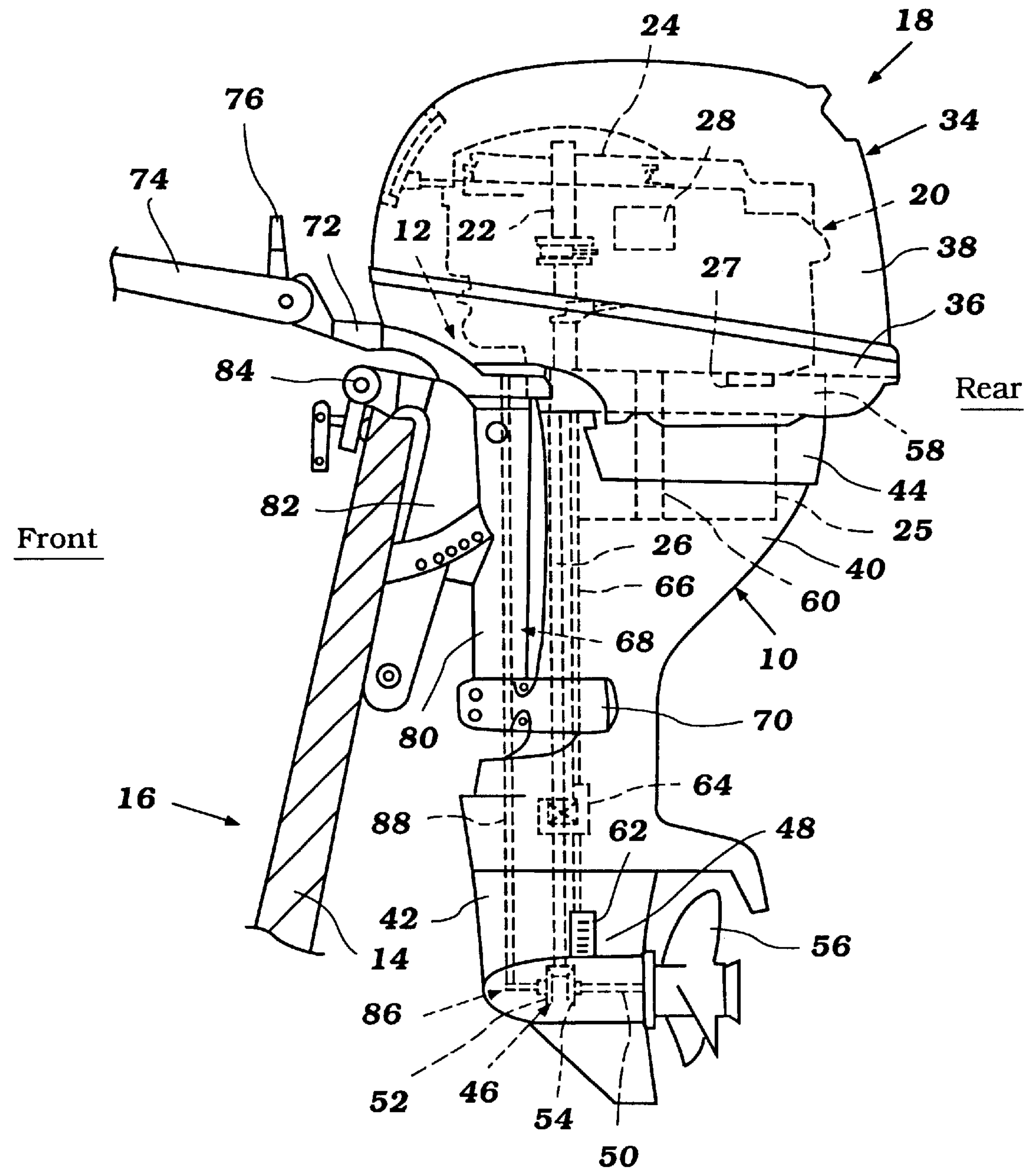
FIG. 1 is a side elevational view of an outboard motor including a shift and throttle control mechanism configured in accordance with a preferred embodiment of the present invention, and illustrates several internal components of the outboard motor in phantom.

FIG. 1 illustrates a marine outboard drive 10 which incorporates a shift and throttle control mechanism 12 configured in accordance with preferred embodiment of the present invention. In the illustrates embodiment, the outboard drive 10 is depicted as an outboard motor for mounting on a transom 14 at the stem of a watercraft 16. It is contemplated, however, that the present shift and throttle control mechanism 12 can be incorporated with other types of marine drives as well.

In order to facilitate the description of the present shifting control mechanism 12 within the outboard motor 10, the terms "front" and "rear" are used to indicate positions of the outboard motor components relative to a fixed datum: the transom 14 of the watercraft 16. Thus, as used herein, "front" refers to a position or a side closer to the watercraft transom 14, and "rear" refers to a position or side distanced from the transom 14. Some of the figures include labels to further aid the reader's understanding.

With initial reference to FIG. 1, the outboard motor 10 has a power head 18 that includes an internal combustion engine 20. Because the present shift and throttle control mechanism 12 has particular utility with a four-cycle engine, the present control mechanism 12 will be described in connection with such an engine; however, the depiction of the control mechanism 12 in conjunction with a four-cycle engine 20 is merely exemplary. Those skilled in the art will readily appreciate that the present control mechanism can be employed with engines having any number of cylinders, having any number of cylinder arrangements or orientations (e.g., V-type or slanted), and/or operating on other than a four-stroke principle (e.g., on a two-cycle principle).

As typical with the outboard motor practice, the engine 20 is supported within the power head 18 so that it's crankshaft 22 rotates about a generally vertical axis within a crankcase. The crankshaft 22 drives a magneto generator flywheel assembly 24 that is affixed at its upper end, as well as a crankshaft pulley which drives a timing belt (not shown). The crankshaft 22 also drives a driveshaft 26 which depends from the power head 18 and rotates about the generally vertical axis, as described below.

The engine 20 also includes an oil pan 25 located on the lower side of the engine 20. The oil pan 25 desirably communicates with the crankcase to receive a flow of oil (or other lubricant) from the crankcase. An oil pump 27 is located within the oil pan and includes an oil pickup. The oil pump 27 delivers oil (or other lubricant) through the oil galleries in the engine 20 to a cylinder head and cylinder block of the engine, and eventually to the crankcase to lubricate the crankshaft.

The engine 20 also includes an induction system to provide a fuel/air charge to the cylinders of the engine 20. In the illustrated embodiment, the engine 20 includes at least one charge former and preferably at least a number of charge formers equal in number to the number of cylinders of the engine 20. In the illustrated embodiment, the charge formers are a plurality of carburetors 28 placed one above another at a central position on a side of the engine, as schematically illustrated in FIG. 1 (although only one of the carburetors 28 is shown). It should be understood, however, although the present shift and throttle control mechanism 12 is described in the context of a carburated engine, certain facets of the present control mechanism 12 may be employed in conjunction with other types of charge formers, such as fuel injectors or the like.

Each carburetor 28 may be of any known type in construction. In the illustrated embodiment, as best understood from FIGS. 2–4 (which depict the carburetor generally isolated from the balance of the induction system and the engine), each carburetor 28 includes a throttle valve (not shown) operated by a throttle shaft 30, and a choke valve (not shown) operated by a choke shaft (not shown). A throttle lever 32 is connected to the end of each of the throttle shaft 30, and a suitable throttle linkage (not shown) connects together the throttle levers 32 so that the throttle valves move in unison when actuated.

As seen in FIG. 1, a protective cowling assembly 34 surrounds the engine 20. The cowling assembly 34 includes a lower tray 36 and a top cowling 38. The tray 36 and cowling 38 together define a compartment which houses the engine 20 with the lower tray 36 encircling a lower portion of the engine 20.

A driveshaft housing 40 extends from the lower tray 36 and terminates in a lower unit 42. The outboard motor can also include an apron cover 44 that depends down from the lower tray 36 and covers a portion of the driveshaft housing 40. The driveshaft 26 extends through the driveshaft housing 40 and is suitably journaled therein for rotation about the vertical axis.

The driveshaft continues into the lower unit 42 where it drives a transmission 46 through an input gear or pinion 48. The transmission 46 selectively couples the driveshaft 26 to a propulsion shaft 50. The transmission 46 advantageously is a forward/neutral/reverse-type transmission. In this manner, the driveshaft 26 drives the propulsion shaft 50 in any of these operational states, as described below in detail.

In the illustrated embodiment, the transmission 46 desirably includes one dog clutch (not shown) which operates between two bevel gears 52, 54. The pinion 48 carried at the lower end of the driveshaft 26 drives the bevel gears 52, 54 in opposite directions. The clutch is coupled to the propulsion shaft 50. The clutch moves between a first position, in which the clutch engages a front bevel gear 52 to drive the propulsion shaft 50 in a forward drive direction, a second neutral position, in which the clutch is disengaged from the bevel gears 52, 54, and a third position, in which the clutch engages the rear bevel gear 54 to drive the propulsion shaft 50 in a reverse direction.

The propulsion shaft 50 can drive a variety of different types of propulsion devices 56, such as, for example, a propeller or a hydrodynamic jet. In the illustrated embodiment, the propulsion device 56 is a single propeller having a plurality of propeller blades; however, it is understood that a counter-rotating, dual propeller propulsion device can also be used.

An exhaust system discharges exhaust gases from an exhaust manifold of the engine 20. The exhaust manifold of the engine communicates with an exhaust conduit formed within an exhaust guide 58 positioned at an upper end of the driveshaft housing 40. The exhaust conduit of the exhaust guide 58 is connected to an exhaust pipe 60 that depends downwardly into the driveshaft housing 40. The exhaust pipe 60 terminates in an expansion chamber formed within the driveshaft housing 40. The expansion chamber in turn communicates with a discharged conduit that is formed within the driveshaft housing 40 and with the lower unit 42 and that communicates with a discharge passage formed within the propulsion device 56. In this manner, exhaust gases from the engine 20 are discharged through the hub of the propeller into a region of reduced pressure behind the propulsion device 56, as known in the art.

The outboard motor 10 also includes an open-loop cooling system. The cooling system includes a water inlet 62 formed on the lower unit 42. In the illustrated embodiment, the water inlet 62 is located on a strut portion of the lower unit 42 above the propulsion shaft 50; however, the inlet 62 can be located at other locations on the lower unit 42, such as forward of the transmission 46. A conduit connects the water inlet 62 to a water pump 64. The water pump 64 draws water from the inlet 62 up through the conduit and into a delivery pipe 66 that extends upward to the engine 20 through the driveshaft housing 40. The cooling water flows through water jackets formed within the engine block, exhaust manifold, cylinder head and exhaust guide 58. At least a portion of the cooling water is then introduced into the exhaust gas flow for known silencing effect In addition, a portion of the cooling water is discharged through a telltale port to indicate proper functioning of the cooling system.

A conventional steering shaft assembly 68 is affixed to the driveshaft housing 40 by upper lower brackets 70. The brackets 70 support the shaft assembly 68 for steering movement. Steering movement occurs about a generally vertical axis which extends through the steering shaft 68.

A steering arm or bracket 72, which is connected to an upper end of the steering shaft 68, extends forward for manual steering of the outboard motor 10, as known in the art. As seen in FIG. 1, a tiller control and steering handle 74 is pivotally connected to the forward end of the steering bracket 72. The pivotal arrangement of the steering handle 74 allows it to be located with any desired vertical orientation, as well as to be tilted up for storage. In addition, a shift operator 76 is located on the steering handle 74 at a location next to the steering bracket 72. Although not shown, the steering handle 74 also includes a twist grip at its forward end. The twist grip typically actuates a disk via a shaft. The shaft extends between the grip and the disk. The shaft is journaled for rotation within the housing of the steering handle 74. The disk member is connected to the other end of the shaft and is provided with a circumferential groove that is adapted to accommodate the inner wires of a pair of throttle control cables 78 (see FIG. 2). The throttle cables 78 are preferably of the bowden-wire type and extend from the steering handle 74 into the cowling 34 of the outboard motor 10, in a conventional manner. The throttle control cables 78 are coupled to the throttle valve shaft 30 in the manner described below.

As seen in FIG. 1, a swivel bracket 80 supports the steering shaft 68. That is, the steering shaft 68 extends through the swivel bracket 80 and rotates relative thereto in order to impart steering movement to the watercraft. Because the steering handle 74 is connected to the steering shaft 68 through the steering bracket 72, side-to-side movement of the steering handle 74 acts to rotate the motor 10 relative to the swivel bracket 80.

The swivel bracket 80 is also pivotally connected to a clamping bracket 82 by a pin 84. The clamping bracket 82, in turn, is configured to attach to the transom 14 of the watercraft 16. This conventional coupling permits the swivel bracket 80, and thus the outboard motor 10, to be pivoted relative to the clamping bracket 82 about the pin 84 to permit adjustment of the trim position of the outboard motor 10, and for tilt-up of the outboard motor 10.

Although not illustrated, it is understood that a conventional hydraulic tilt and trim cylinder assembly, as well as a conventional hydraulic steering cylinder assembly, can be used as well with the present outboard motor. The construction of the steering and trim mechanisms is considered to be conventional, and for that reason, further description is not believed necessary for an appreciation or understanding of the present invention.

As seen in FIG. 1, a conventional transmission actuator 86 is used to change the drive condition of the transmission 46. For instance, the transmission actuator 86 can include a cam (not shown) connected to a lower end of a shift rod 88. The cam cooperates with a follower that is supported at the end of the propulsion shaft 50. A shift plunger (not shown) is connected to the follower in a manner allowing the shift plunger to rotate which propulsion shaft 50 while being able to reciprocate between positions along the axis of the propulsion shaft 50 upon rotation of the cam. This reciprocating linear movement of the plunger moves the dog clutch of the transmission 46 to force the dog clutch into and out of engagement with the gears 52, 54 of the transmission 46, as known in the art.

The shift rod 88 extends outwardly through the lower unit 42 and into the drive shaft housing 40. The shift rod 88 also extends upwardly through the swivel bracket 80 and steering shaft 68 and connects to a portion of the shift and throttle control mechanism 12, as described below.

Figure 2:
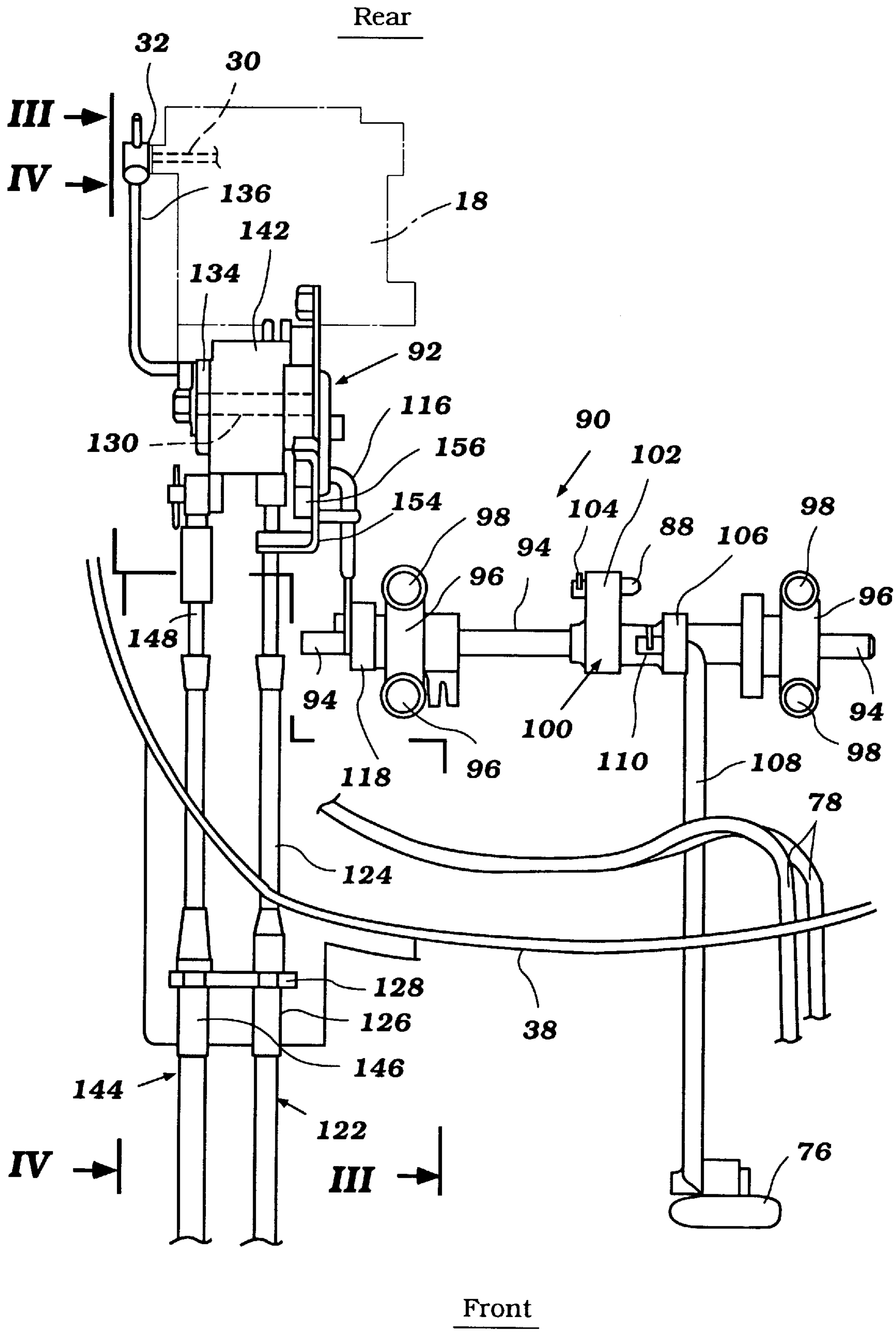
FIG. 2 is a top plan view of the shift and throttle control mechanism of FIG. 1, and illustrates a portion of an engine of the outboard motor in phantom.
Figure 3:
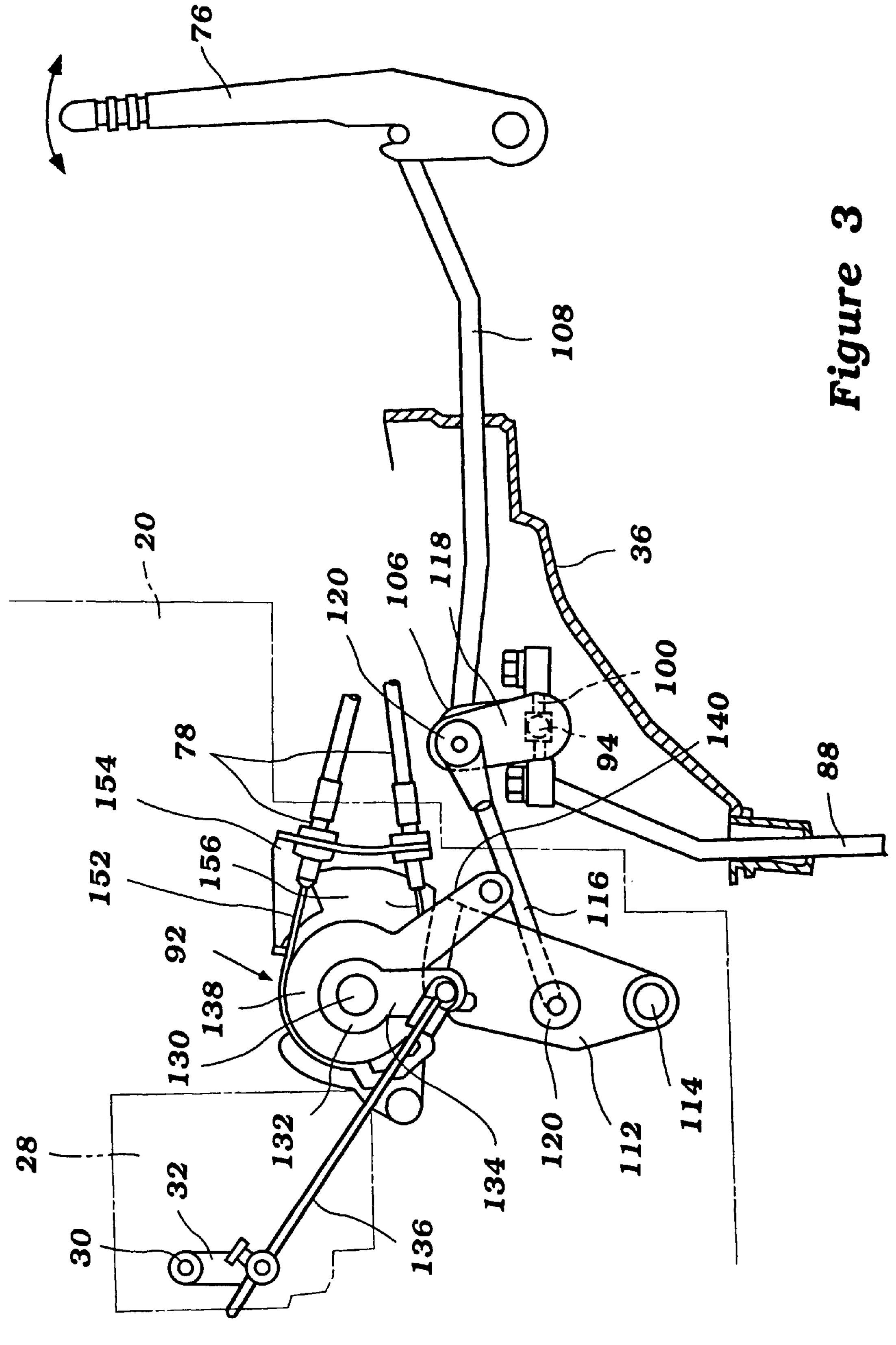
FIG. 3 is a partial side view of the shift and throttle control mechanism of FIG. 2 taken along line III—III, and illustrates the mechanism in relation to a portion of the engine (shown in phantom) and a portion of a lower tray of the outboard motor cowling.
Figure 4:
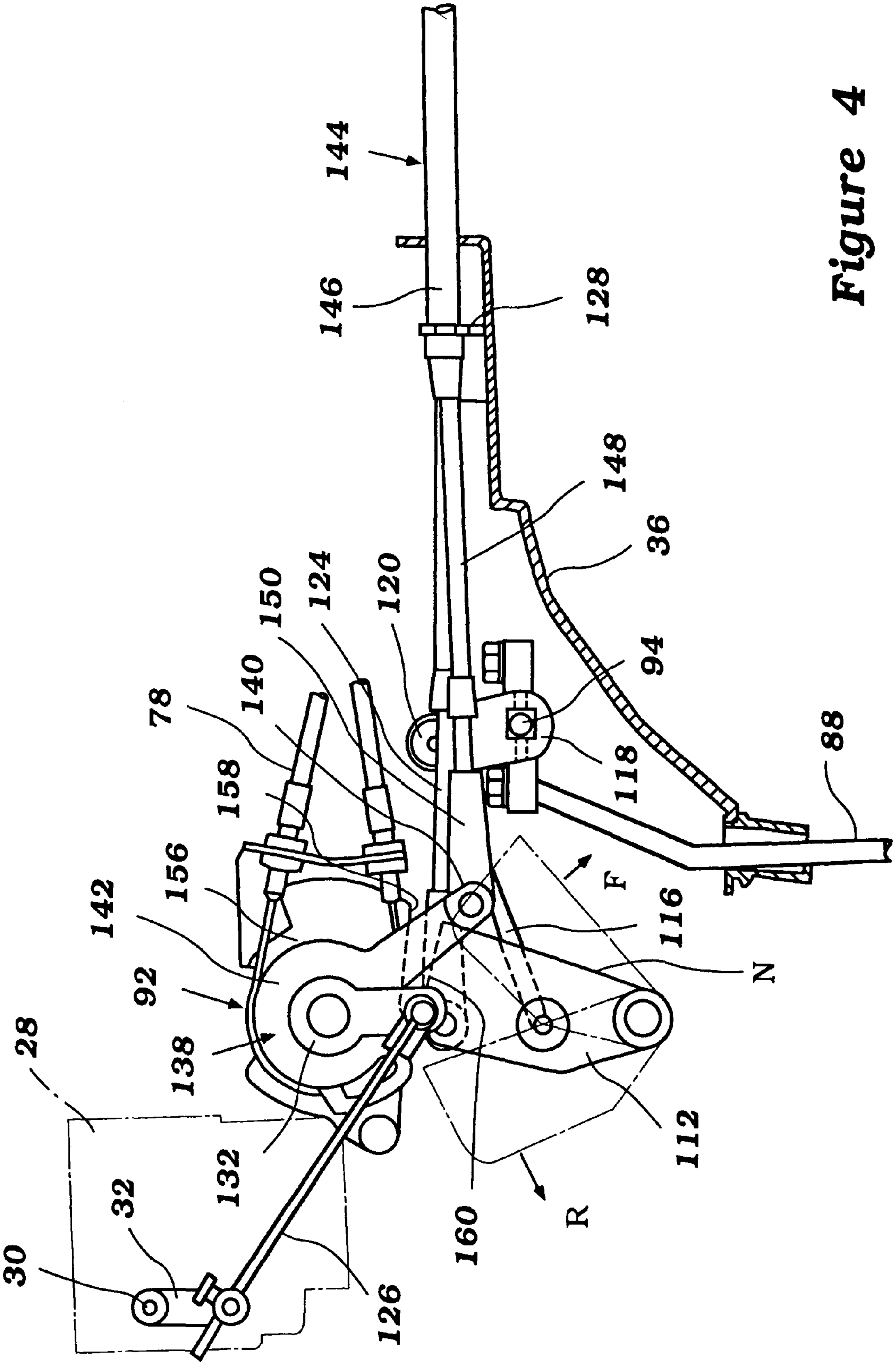
FIG. 4 is a side elevational view of the shift and throttle control mechanism shown in FIG. 3 taken along line IV—IV, and illustrates a shift lever of the mechanism in a neutral position, shown in solid line, and also in a forward and a reverse position, shown in phantom lines.

With reference now to FIGS. 2–4, the shift and throttle control mechanism 12 principally includes a shifting mechanism 90 and a throttle valve drive unit 92. The shifting mechanism 90 includes a shift shaft 94 which extends generally parallel to a front side of the cowling 34 and is located on the lower front side of the engine 20. As best seen in FIG. 2, the shift shaft 94 is journaled at this location by a pair of brackets 96. A plurality of bolts 98 secure the brackets 96 to the lower tray 36 of the cowling 34 at this position. The brackets 96 journal the shift shaft 94 for rotation at this location.

A coupler 100 connects the shift rod 88 to the shift shaft 94. In the illustrated embodiment, the coupler 100 includes a lug or lever 102 rigidly connected to the shift shaft 94, at one end of the lever 102. The opposite end of the lever 102 includes a through hole through which an upper bent end of the shift rod 88 extends. A cotter pin 104 expend through a hole on the bent end of the shift rod 88 to maintain the pivotal interconnection between the shift rod 88 and the coupler 100. From this position, as best seen in FIG. 3, the shift rod 88 extends downward through the lower tray 36 and into the steering shaft assembly 68, as described above. In the illustrated embodiment, the shift rod 88 includes a bent section and lies on the lower front lower side of the engine 20.

A shift lever 106 is also fixedly connected to the shift shaft 94. In the illustrated embodiment, this shift lever 106 is positioned between the coupler 100 and one of the brackets 96 that supports the shift shaft 94. The shift lever 106 is arranged on the shift shaft 94 so as to extend in the direction generally normal to the coupler 100. That is, in the illustrated embodiment, the coupler 100 extends to the rear side of the shift shaft 94 while the shift lever 106 extends upward from the shift shaft 94.

A linkage rod 108 connects the shift operator 76 on the steering handle 74 to the shift lever 106. As best seen in FIG. 2, the linkage rod 108 includes a bent end which extends through a through hole formed on the upper end of the shift lever 106 to form a pivotal coupling. A cotter pin 110 extends through a hole at the end of the linkage rod bent end to prevent the linkage rod 108 from disengaging from the shift lever 106. The linkage rod 108 thus conveys movement of the shift operator 76 on the steering handle 74 to the shift shaft 94 to actuate the shift rod 88 in the manner described below.

The shifting mechanism 90 also includes another shift lever 112, which as best seen in FIG. 3, lies on the side of the engine 20. A rotatable coupling 114 supports the shift lever 112 at this position. This rotatable coupling 114 lies toward a lower front end of the engine 20. In this position, the shift lever 112 generally lies, at least moving front to rear, between the shift shaft 94 and the throttle valve shaft 30 of the engine 20, as appreciated from the views illustrated in FIGS. 2–4.

A link 116 connects the second shift lever 112 to a third shift lever 118 that is provided on the shift shaft 94. In the illustrated embodiment, the link 116 is pivotally connected to the second shift lever 112 at a position above the rotatable coupling 114. For this purpose, a conventional rotatable connector 120 pivotally connect the link 116 with the second shift lever 112 and with the end of the third shift lever 118. In the illustrated embodiment, the link 116 is generally straight, except for its bent ends that connect to the connectors 120.

The third shift lever 118 is connected to the shift shaft 94 at the position generally forward of the second shift lever 112, as appreciated from FIG. 2. One end of the third shift lever 118 is fixed to the shift shaft 94 while the other end of the lever is pivotally connected to the link 116. As seen in FIG. 3, the third shift lever 118 extends generally upward from the shift shaft 94, generally parallel to the first shift lever 106, and lies on the front lower side of the engine 20.

As seen in FIGS. 2 and 4, a shift control cable 122 connects to the shift lever 112 on the side of the engine 20. In the illustrated embodiment, the cable 122 is a bowden-wire type cable which includes an inner cable wire 124 that slides through an outer tubular casing 126. As best seen in FIG. 4, a bracket 128 fixes the end of the tubular casing 126 at a location within the lower tray 36. The cable wire 124 extends rearward from the bracket 128 and terminates at a fitting 131. The fitting is pivotally connected to one side (e.g., an inner side) of the shift lever 112 at a point above which the link 116 is connected. The throttle control cable 122 thus rotates the shift shaft 94 through the linkage formed by the shift lever 112 located on the side of the engine, the link 116, and the third shift lever 118 affixed to the shift shaft 94.

As best seen in FIGS. 3 and 4, the throttle valve drive unit 92 is located above the shift lever 112 on the side of the engine 20. In the illustrated embodiment, the throttle valve drive unit 92 includes a support shaft 130. The support shaft 130 extends from the side of the engine and is fixed thereto. A first lever element 132 is journaled to the support shaft 130 and includes an arm 134 which projects from the lever element 132. In the illustrated embodiment, the arm 134 projects in a downward direction with the throttle valve in a position corresponding to an idle running condition. A link 136 extends between the end of the lever element arm 134 and the throttle lever 32 attached to the throttle shaft 30. The link 136 desirably is straight and is coupled to both the arm 134 and the throttle lever 32 by conventional rotatable couplings. Rotation of the first lever element 132 thus rotates the throttle shaft 30 so as to move the throttle valve by a corresponding degree.

In the illustrated embodiment, the throttle valve drive unit 92 includes a second lever element 138 which is connected to at least one throttle control operator. The second lever element 138 includes an arm 140 that extends from a bearing body 142. The bearing body 142 includes a center hole through which the support shaft 130 extends. Thus, the bearing body 142 rotates relative to the support shaft 130. Desirably, the first and second lever elements 132, 138 are connected so as to rotate together.

A throttle control cable 144 is connected to the arm 140 of the second lever element 138. In the illustrated embodiment, the throttle control cable 144 is a bowden-wire type cable. The bracket 128 supports an end of the outer casing 146 of the cable 144 in a manner similar to that described in connection with the shift control cable 122 at a position within the lower tray 36. A cable wire 148 extends rearward and terminates at a fitting 150. The fitting 150 is rotatably connected to the arm 140 of the second lever element 138. Axial movement of the throttle control cable wire 148 thus causes the second lever element 138 to rotate about the support shaft 130. The first lever element 132 moves with the second lever element 138 to actuate the throttle levers 32 of the throttle valves.

The second lever element 138 also includes a circumferential groove that extends about an outer peripheral edge of at least a portion of the bearing body 142. Exposed ends of throttle control cable wire 152 extend rearward from the throttle control cables 78. One of the throttle control cable wires 152 wraps around a portion of the upper side of the bearing body 142 and is connected to the second lever element 138 by a conventional coupling. Likewise, the exposed end of the second throttle control cable wire 152 wraps around the lower side of the second lever element 138 and is connected to the second lever element 138 by a conventional coupling. Rotation of the disk element attached to the twist grip thus is transmitted to the second lever element 138 through the throttle control cable 78, in a known manner. The second lever element 138 causes the first lever element 132 to rotate so as to actuate the throttle levers 32 when the twist grip is turned.

A cable fixing plate 154 is attached to the engine 20 at a point near the second lever element 138. This plate 154 supports the ends of the casings of the throttle control cables 78 that extend from the steering handle 74.

The throttle valve drive unit 92 also includes a cam member 156. The cam member 156 is affixed to the bearing body 142 of the second lever element 138 so as to rotate with the second lever element 138. As best understood from FIG. 4, the cam member 156 includes a lower contact face 158 which engages an upper contact face 160 of the shift lever 112 on the side of the engine 20. When the shift lever 112 is in a position corresponding to a neutral position of the transmission 46 (the position being generally indicated by letter "N" in FIG. 4), the throttle valve drive unit 92 can rotate only a limited degree before the lower contact face 158 of the cam member 156 abuts against the contact face 160 of the shift lever 112. In this manner, the degree to which the throttle valves can be opened, and thus the engine speed, is limited with the transmission and the associated shifting mechanism 92 in a neutral position. However, when the shift lever 112 is moved either to a position corresponding to a forward drive condition of the transmission 46 (the position being generally indicated by letter "F" in FIG. 4) or to a position corresponding to a reverse drive condition of the transmission (the position being generally indicated by letter "R" in FIG. 4), the upper contact face 116 of the shift lever 112 no longer lies beneath the contact face 158 of the cam member 156. The throttle valve drive unit 92 thus is not limited to the same degree as when a neutral drive condition is established. Importantly, because the shift lever 112 rotates entirely out of the rotational arc of the cam member 156 when a forward drive condition is established, the shift lever 112 does not interfere with the rotation of the throttle valve drive unit 92. The shift lever 112, however, can be configured to limit throttle movement beyond a certain degree when under a reverse drive condition.

The present shift and throttle control mechanism 12 thus provides an arrangement of the corresponding linkages so as to permit the ends of the throttle and shift cables 122, 144 to be fixed within the lower tray 36 of the cowling 34. In addition, the shift and throttle control mechanism 12 also includes a neutral safety mechanism to prevent engine speeds above a certain level when the transmission 46 establishes a neutral drive condition. The arrangement of this mechanism on the side of the engine 20 also allows for a straight link 136 to be used between the throttle valve drive unit 92 and one of the throttle levers 32. As such, fabrication costs of the engine are reduced and the feel of the shift and throttle control through a remote operator is enhanced.

Figure 5:
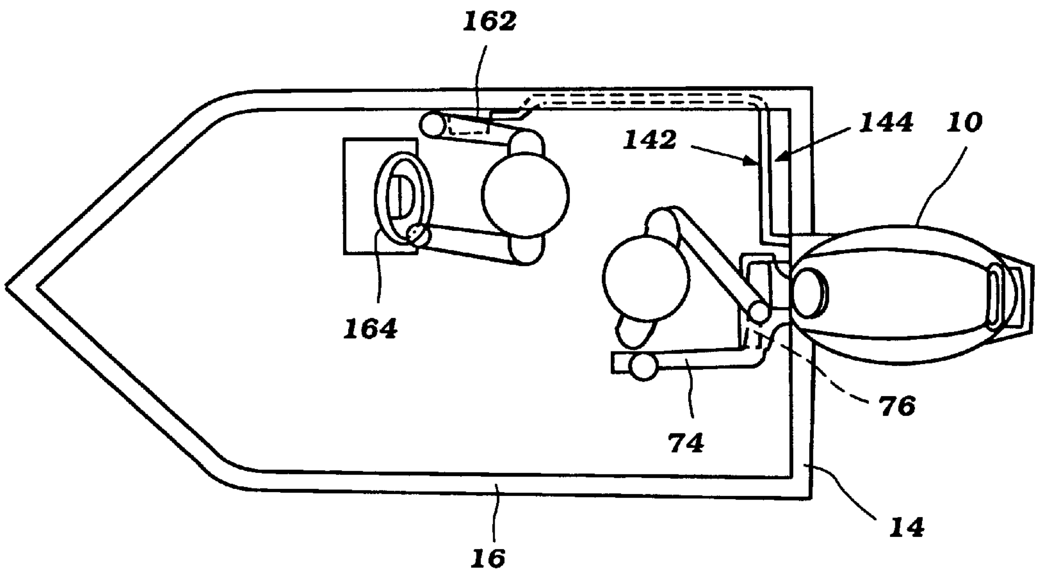
FIG. 5 is a top plan view of a watercraft with the outboard motor of FIG. 1, and illustrates the possible positions of two operators that can be used with the present shift and throttle control mechanism.

FIG. 5 illustrates an application of the present shift and throttle control mechanism 12. The present outboard motor 10 is mounted on the transom 14 of the watercraft 16. The steering handle 74 extends into the hull of the watercraft 16 and can be operated by a person positioned near the transom 14. This person can control the engine speed by operating the twist grip on the end of the handle 74. By turning the twist grip, the second lever element 138 of the throttle valve drive unit 92 is rotated in a manner described above. The first lever element 132 rotates with the second lever element 138 so as to move the throttle lever 32 and open or close the associated throttle valve. This movement is also conveyed to the other throttle valves by the conventional throttle linkage (not shown).

The person positioned next to the transom can also control the transmission 46 of the outboard motor 10. The shift operator 76 located next to the steering handle 74 can be moved fore or aft in order to shift the transmission 46. Forward movement of the shift lever 76 causes the shift shaft 94 to rotate in a clockwise direction, as viewed in FIG. 3. This movement in turn raises the shift rod 88. The corresponding movement of the transmission actuator 86 causes the dog clutch of the transmission 46 to engage the front bevel gear 52 of the transmission 46. The dog clutch therefore couples the propulsion shaft 50 to the front bevel gear 52 so as to cause the associated propulsion device 56 to rotate in a forward drive direction.

Likewise, aft movement of the shift operator 76 causes the shift shaft 94 to rotate in a counter-clockwise direction. In particular, the aft movement is conveyed to the first shift lever 106 by the linkage rod 108. This aft movement of the upper end of the first shift lever 106 causes the shift shaft 92 to rotate counter-clockwise. The shift rod 88 in turn moves downward with this rotation of the shift shaft 94. The transmission actuator 86 disengages the dog clutch from the front bevel gear 52 when the shift rod moves downward. When disengaged, the transmission actuator 86 establishes a neutral drive condition.

Importantly, this movement of the shift rod 88 is also conveyed to the shift lever 112 on the side of the engine 20. Therefore, when a transmission 46 is in the neutral position, the shift lever 112 limits the degree of rotation of the throttle valve drive unit 92 so as to restrict the engine speed when in a neutral drive condition.

Further aft movement of the shift operator 76 continues to move the shift rod 88 downward and causes the transmission actuator 86 to couple the dog clutch with the rear bevel gear 54. Rotation of the rear bevel gear 54 is thus transferred to the propulsion shaft 50 through the dog clutch so as to drive the propulsion device 56 in a direction creating a rearward drive thrust. The transmission 46 is disengaged from the established rearward drive condition by moving the shift operator 76 forward.

As also seen in FIG. 5, a remote operator 162 desirably is positioned next to a steering control 164 of the watercraft 16. The remote operator 162 is connected to the shift and throttle control mechanism 12 via the shift and throttle control cables 122, 144.

Figure 6A:
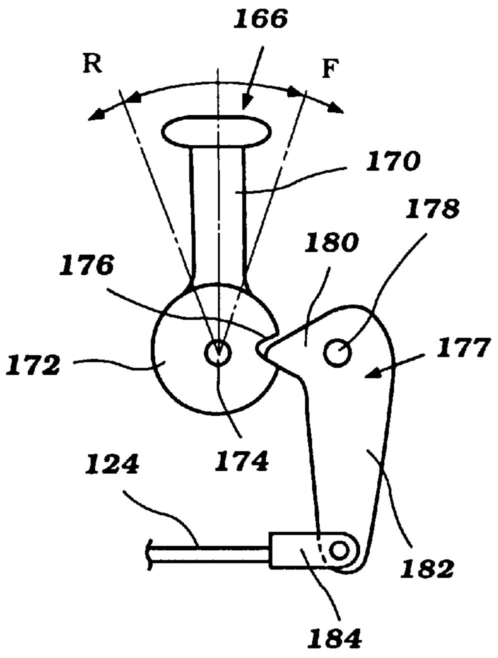
FIG. 6A is a partial side view of a shift portion of a remote operator that can be used with the present shift and throttle control mechanism.

The remote operator 162 includes a shift operator 166 and a throttle operator 168. The shift operator 166 is illustrated in FIG. 6A and includes a shift handle 170 connected to a body portion 172. The body portion 172 rotates about a support shaft 174. The body portion 172 also includes a notch 176 which cooperates with an end of a control lever 177. The control lever 177 is supported to rotate about a support shaft 178 and includes a first arm 180 which nests within the notch 176 of the operator body 172 and a second arm 182 which depends down from the point at which the lever 177 is supported. An exposed end of the shift control cable wire 124 terminates in a fitting 184 on its front end. The fitting 184 is pivotally connected to the second arm 182 of the control lever. In this manner, movement of the shift operator handle 170 causes the control lever 177 to rotate about the support shaft 178. This motion in turn moves the shift control cable 124 axial so as to actuate the shifting mechanism 90.

Figure 6B:
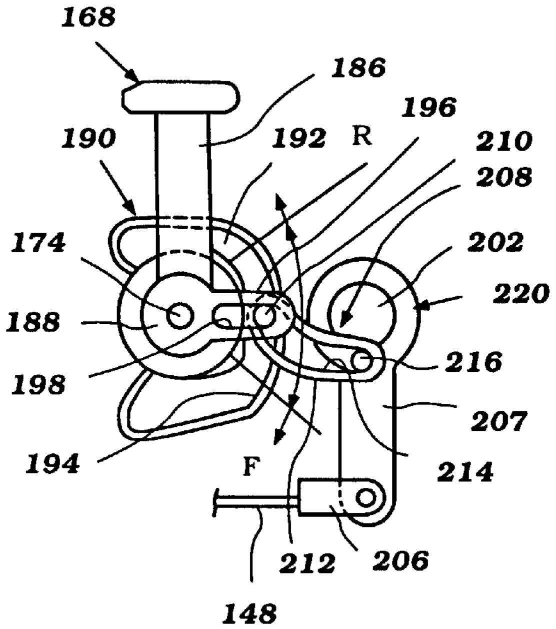
FIG. 6B is a partial side view of a throttle portion of a remote operator that can be used with the present shift and throttle control mechanism.

Movement of the operator handle 170 in a clockwise direction causes the control lever 177 to rotate in a counter-clockwise direction and to move the shift control cable 124 forward. (It should be appreciated that the discussion of the directional movement associated with the components of the remote operator 168 is merely exemplary.) This forward movement is transmitted to the shift lever 112 on the side of the outboard motor engine 20. The forward movement in turn causes the third shift lever 118 and the shift shaft 94 to rotate clockwise to raise the shift rod 88. In doing so, as described above, the transmission actuator 86 moves the dog clutch from a centrally neutral position to a point where the dog clutch engages the front bevel gear 52 to establish a forward drive condition. In FIG. 6, the corresponding position of the operator handle 170 when a forward drive condition is established is indicated generally by reference letter "F".

Movement of the operator handle 170 in a counterclockwise direction causes the control lever 177 to rotate in a clockwise direction and moves the shift control cable 124 rearward. This rearward movement is transmitted to the shift lever 112. The rearward movement in turn causes the third shift lever 118 and the shift shaft 94 to rotate counterclockwise to lower the shift rod 88. In doing so, as described above, the transmission actuator 86 moves the dog clutch from a centrally neutral position to a point where the dog clutch engages the rear bevel gear 54 to establish a reverse drive condition. In FIG. 6, the corresponding position of the operator handle 170 when a reverse drive condition is established is indicated generally by reference letter "R".

The throttle operator 168 includes a handle 186 that rotates about a rotation shaft 188. The shift and throttle handles 170, 186 desirably lie adjacent to each other so as to be easily moved in unison. For this purpose, the rotation shaft 188 is fixed to and is supported by the support shaft 174—the same shaft that supports the shift operator handle 170.

A cam member 190 is attached to the operator handle 186 and rotates with it. The cam member 190 includes a groove 192 with an arcuate cam surface 194. Between the points labeled by reference letters R and F in FIG. 6, the cam surface 194 has a radius of curvature greater than a predetermined radius. The radius between the cam surface groove 194 and a rotational axis of the handle 186, however, desirably decreases in a linear manner on either side of the area defined between the reference points R and F.

The rotation shaft 188 includes a link arm 196 that extends over the groove 192 at a location between the reference points R and F. The link arm 196 includes a slot 198.

The throttle operator 168 also includes a second control lever 200 that rotates about a support shaft 202. The lever 200 includes an arm 204. The throttle control cable 148 is connected to the outer end of the arm 204. For this purpose, the cable wire terminates at its forward end in a fitting 206. The fitting 206 is pivotally coupled to the lower end of the lever arm 202.

A link member 208 couples together the cam member 190 and the second control lever 200. The link member 208 includes a first pin 210 positioned between the slot 198 on the link arm 196 and the groove 192 on the cam member 190.

A link 212 is attached to the first pin 210 and includes a groove 214. A second pin 216 is positioned in the groove 214 and is attached to the second control lever 200.

Movement of the operator handle 186 within the range between the reference points R, F does not cause the cam surface 194 of the cam member groove 192 to act on the first pin 210. This movement thus is not transferred to the second control lever 200. However, beyond either reference point R, F, the cam member groove surface 194 against the pin 210, pulling the pin 210 inward toward the rotational axis of the operator handle 186. The slot 198 in the link arm 196 acts as a guide such that the first pin 210 slides within the slot 198 during this process.

Movement of the first pin 210 toward the rotational axis of the throttle operator handle 186 causes the second control lever 200 to rotate counterclockwise as the second pin 216 follows the movement of the first pin 210. Rotation of the lever 200 in turn moves the throttle cable 148 to actuate the throttle valve drive unit 92 in the manner described above.

The throttle operator handle 186 thus can be moved with the shift operator handle 170 through the neutral range (i.e., between the reference points R and F) because of the lost motion connection provided by the cam member 190 of the remote throttle operator 168. This feature cooperates with the neutral safety mechanism of the present shift and throttle control mechanism 12 to control the ergonomics while preventing elevated engine speeds with the outboard motor 10 in neutral.

Although this invention has been described in terms of a certain preferred embodiment, other embodiments apparent to those of ordinary skill in the art are also within the scope of this invention. Accordingly, the scope of the invention is intended to be defined only by the claims that follow.

What is claimed is:

1. An outboard motor comprising an engine which drives a propulsion device through a transmission, the transmission intended to operate under at least two operational conditions, a transmission actuator cooperating with the transmission to selectively establish one of said at least two operational conditions, a shifting mechanism coupled to the transmission actuator by a shift rod so as to control the transmission actuator, and a shift control cable connected to the shift mechanism through a first shift lever and a link connecting the shift lever to the shifting mechanism, wherein the engine includes at least one throttle valve, and the first shift lever is located between the throttle valve and the shifting mechanism.

2. An outboard motor as in claim 1 additionally comprising a shift linkage rod directly connected to the shifting mechanism.

3. An outboard motor as in claim 2, wherein the shift control cable is connected to a remote operator provided apart from the outboard motor, and the shift linkage rod is connected to a shift operator located near a steering handle of the outboard motor.

4. An outboard motor as in claim 2, wherein the shifting mechanism comprises a shift shaft provided with second and third shift levers, and the shift linkage rod is connected to the second shift lever and the link is connected to the third shift lever.

5. An outboard motor as in claim 1 additionally comprising a throttle valve drive unit located adjacent the first shift lever.

6. An outboard motor as in claim 5, wherein the throttle valve drive unit includes at least two lever elements which are interconnected so as to rotate together, and the throttle valve is connected to one of the lever elements through a linkage.

7. An outboard motor as in claim 6 additionally comprising a first throttle control cable connected to one of the lever elements of the throttle valve drive unit, and a second throttle control cable connected to the same lever element.

8. An outboard motor as in claim 7, wherein the first throttle control cable is connected to a remove operator provided apart from the outboard motor, and the second throttle control cable is connected to a throttle control operator located near a steering handle of the outboard motor.

9. An outboard motor as in claim 6, wherein the throttle valve drive unit additionally comprises a cam member, and the cam member is positioned relative to the first shift lever such that rotation of the cam member is limited by the first shift lever within a predetermined range of rotation of the first shift lever.

10. An outboard motor as in claim 9, wherein the transmission is intended to operate under at least a neutral condition and a drive condition, and the predetermined range of rotation of the first shift lever corresponds to a range of movement of the transmission actuator in which the transmission is under the neutral condition.

11. An outboard motor as in claim 1, wherein the transmission and the transmission actuator are located below the engine near the propulsion device.

12. An outboard motor as in claim 1, wherein the engine is a four-cycle, internal combustion engine.

13. An outboard motor comprising an engine having at least one throttle valve and an output shaft which drives a propulsion device through a transmission, the transmission intended to operate under at least two operational conditions, a transmission actuator cooperating with the transmission to selectively establish one of said at least two operational conditions, a shifting mechanism to control the transmission actuator, and a throttle valve drive unit coupled to the throttle valve, the throttle valve drive unit including a cam member positioned to interact with a rotatable shift lever of the shifting mechanism, whereby rotation of the cam member is limited by the shift lever within a predetermined range of rotation of the shift lever, wherein the shift lever is arranged between the throttle valve and the shifting mechanism on the side of the engine.

14. An outboard motor as in claim 13, wherein the transmission is intended to operate under at least a neutral condition and a drive condition, and the predetermined range of rotation of the rotatable shift lever corresponds to a range of movement of the transmission actuator in which the transmission is under the neutral condition.

15. An outboard motor as in claim 13 additionally comprising a shift control cable connected to the shift lever.

16. An outboard motor as in claim 13, wherein a generally straight link couples the throttle valve drive unit to the throttle valve.

17. An outboard motor as in claim 13, wherein the throttle valve drive unit includes at least two lever elements which are interconnected so as to rotate together, and the throttle valve is connected to one of the lever elements through a link.

18. An outboard motor as in claim 17 additionally comprising a first throttle control cable connected to one of the lever elements of the throttle valve drive unit, and a second throttle control cable connected to the same lever element.

19. An outboard motor as in claim 18, wherein the first throttle control cable is connected to a remove operator provided apart from the outboard motor, and the second throttle control cable is connected to a throttle control operator located near a steering handle of the outboard motor.

20. An outboard motor comprising an engine having at least one throttle valve and an output shaft which drives a propulsion device through a emissions the transmission intended to operate under at least two operational conditions, a transmission actuator cooperating with the transmission to selectively establish one of said at least two operational conditions, a shifting mechanism to control the transmission actuator, and a throttle valve drive unit coupled to the throttle valve, the throttle valve drive unit including a throttle over and a cam member coupled together and mounted on a single bearing element, a remote throttle operator positioned to interact with the throttle lever, a remote shift operator positioned to interact with a shift lever of the shifting mechanism, whereby rotation of the cam member is limited by the shift lever within a predetermined range of rotation of the shift lever.

21. An outboard motor as in claim 20 wherein the single bearing element extends from a side of the engine.

22. An outboard motor as in claim 20 wherein the shifting mechanism further includes a shift shaft that is coupled to the transmission actuator by a shift rod and a link that couples the shift lever to the shift shaft.

23. An outboard motor as in claim 22 wherein the outboard motor further includes a shift operator that is coupled to the shift shaft by a linkage rod.

24. An outboard motor as in claim 20 wherein said throttle lever is also coupled to a second throttle operator.

* * * * *

UNITED STATES PATENT AND TRADEMARK OFFICE

CERTIFICATE OF CORRECTION

PATENT NO. : 6,077,136
DATED : June 20, 2000
INVENTOR(S) : Hideto Arai and Kazumasa Tanimoto It is certified that error appears in the above-identified patent and that said Letters Patent is hereby corrected as shown below:

Title page,
Foreign Application Priority Data, change "9-08766" to -- 09-83766 --.

Signed and Sealed this

Twenty-sixth Day of February, 2002

*Attest:*

JAMES E. ROGAN

*Attesting Officer*

*Director of the United States Patent and Trademark Office*